United States Patent
Jakubowski, Jr. et al.

[11] Patent Number: 6,119,982
[45] Date of Patent: Sep. 19, 2000

[54] PRE-LOADED STORES EJECTION RAM SYSTEM AND METHOD

[75] Inventors: Thaddeus Jakubowski, Jr., St. Charles; John K. Foster, Florissant, both of Mo.

[73] Assignee: McDonnell Douglas Corporation, St. Louis, Mo.

[21] Appl. No.: 09/054,787

[22] Filed: Apr. 3, 1998

[51] Int. Cl.[7] .................................................. B64D 1/12
[52] U.S. Cl. .................................. 244/137.4; 294/82.26; 294/5; 89/1.54
[58] Field of Search .............................. 244/137.4, 137.1; 294/82.29, 82.26, 82.24, 88; 89/1.53, 1.54

[56] References Cited

U.S. PATENT DOCUMENTS

| | | |
|---|---|---|
| 3,056,623 | 10/1962 | Herbert . |
| 3,871,604 | 3/1975 | Coutin .................................. 244/137.4 |
| 4,043,525 | 8/1977 | Jakubowski, Jr. . |
| 4,095,762 | 6/1978 | Holt . |
| 4,347,777 | 9/1982 | Jakubowski, Jr. et al. . |
| 4,441,674 | 4/1984 | Holtrop . |
| 4,552,327 | 11/1985 | Carter . |
| 5,029,776 | 7/1991 | Jakubowski et al. . |
| 5,583,312 | 12/1996 | Jakubowski, Jr. . |
| 5,904,323 | 5/1999 | Jakubowski, Jr. et al. . |

*Primary Examiner*—Peter M. Poon
*Assistant Examiner*—Tien Dinh
*Attorney, Agent, or Firm*—Alston & Bird LLP

[57] ABSTRACT

The stores ejection system and method of the present invention provide automatic pre-load device, such as a pneumatically-operated pre-load piston, to pre-load a store ejection ram into contact with a bomb or other store prior to store ejection. Mechanical shock to the store during ejection is thereby minimized. The ejection system automatically retracts following store ejection to minimize ejection system aerodynamic drag during flight.

19 Claims, 5 Drawing Sheets

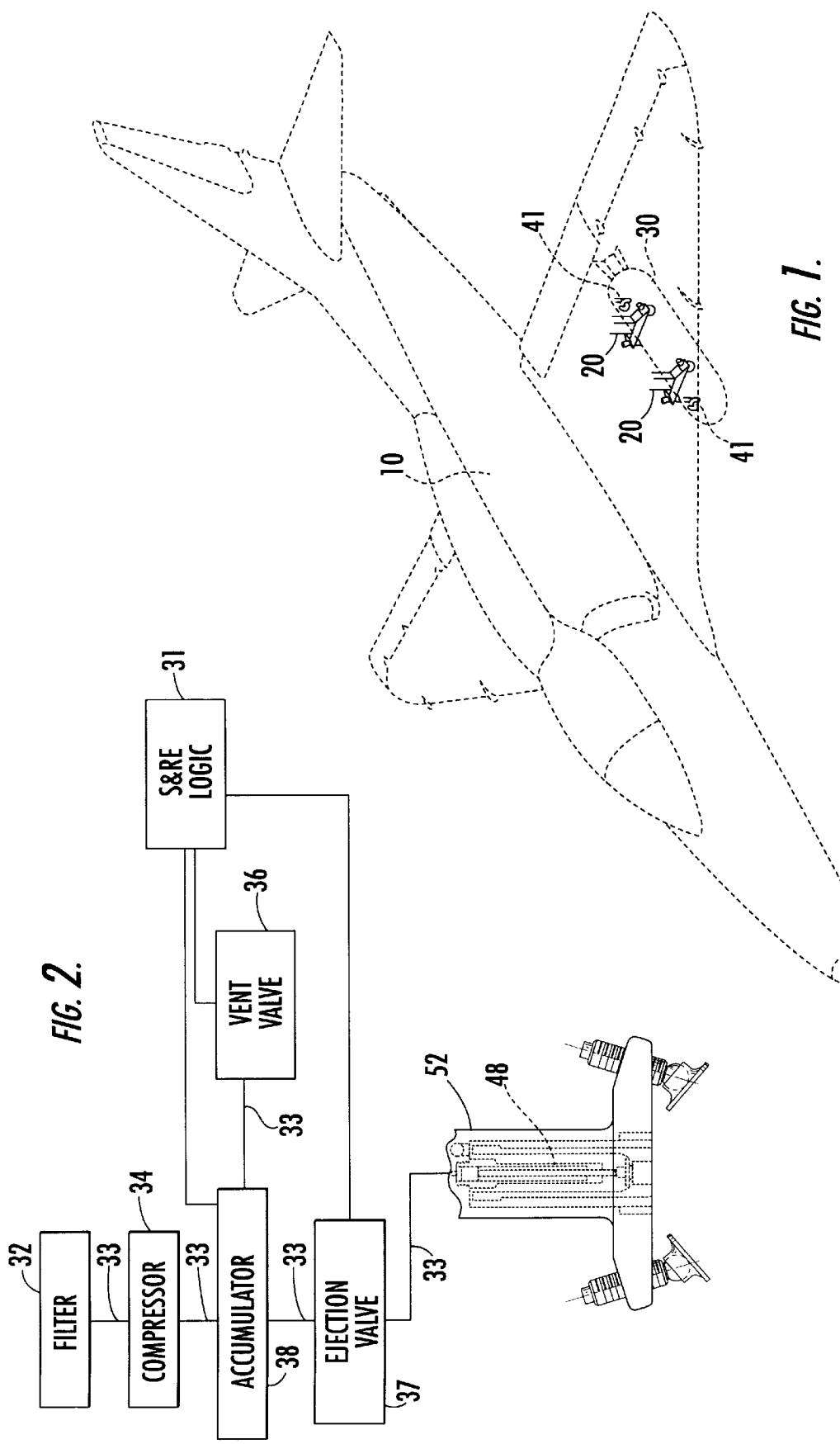

PRE-LOADED STORES EJECTION RAM SYSTEM AND METHOD

FIELD OF THE INVENTION

This invention relates generally to store ejector racks for releasably mounting a bomb or other store on an aircraft and, more particularly, to a stores ejection system and method for ejecting a store from an aircraft by forcing an ejection ram against the store upon command.

BACKGROUND OF THE INVENTION

Military strike aircraft are designed to carry, release, and deliver a wide range of weapons and other "stores" (bombs, for example) while in flight. Aircraft used to deliver stores in flight typically incorporate suspension and release equipment (S&RE), such as ejector racks, that are located beneath the wings and fuselage and are designed to forcibly release the stores upon command. Typical ejector racks are disclosed in U.S. Pat. Nos. 4,043,525 and 4,347,777, both of which are assigned to an affiliate of the entity to which the present invention is assigned.

In a typical stores release and ejection system, a mechanism is activated that mechanically releases and forcibly ejects the store from the aircraft upon command. During the ejection process, ejection pistons or rams housed within the S&RE equipment are forced outward against the store and cause the store to be forcibly ejected away from the aircraft body. These rams are extended outward in a matter of milliseconds at extremely high loads, potentially producing considerable mechanical shock to both the ejection ram and the store. If proper precautions are not observed, these high loads may result in damage to the ejection rams or to the store itself. Limiting mechanical shock loads to the store has become increasingly important with the increasing use of smart weapons incorporating shock-sensitive electronic equipment.

A typical ejection ram comprises a single piston or a set of coaxial telescoping pistons and is packaged in a structural housing that provides some length for ram extension. The structural housing also provides surfaces for stopping the motion of the ram as well as surfaces for fluid sealing piston rings to travel along. During ejection, high pressure fluid (either gas or liquid) is introduced into the housing, forcing the piston outward and in turn ejecting the store.

Early ejector racks typically utilized pyrotechnic cartridges as an energy source for supplying high-pressure fluid to the ejection rams. While pyrotechnic charges provide a weight-efficient ejection power source, they generate significant residue, require frequent cleaning and other maintenance, pose a safety hazard, and exhibit other undesirable limitations.

Some newer ejector rack designs employ a combination of pressurized gas and hydraulics to operate pneumatic ejector mechanisms. In these systems, pressurized gas is stored in an accumulator and is used to transfer ejection energy to a fluid that in turn actuates ram ejectors upon command. Such an apparatus is disclosed in U.S. Pat. No. 4,095,762 to Holt. The Holt apparatus has several undesirable limitations, however, including excessive weight, a complex two-fluid (gas and liquid) system, complicated maintenance requirements, and an inability to compensate for changes in outside pressure and temperature during flight.

A further improvement in ejector rack design is disclosed in U.S. Pat. No. 5,583,312 to Jakubowski, in which a pneumatic ejector rack having a single on-board pressurization system for initiating multiple release mechanisms is disclosed. U.S. Pat. No. 5,583,312 is incorporated herein by reference. The Jakubowski system uses filtered pressurized air as both an energy source and an energy transfer medium and thus requires no hydraulics. Since the compressor system is on-board, a constant pressure may be maintained independent of outside temperature and pressure changes. In operation, the pressurized gas from the accumulator, when released through a feed port, opens store release hooks and simultaneously forces ejector pistons outward, thereby forcibly releasing and jettisoning the store.

To minimize mechanical shock during ejection, the aforementioned ejector racks typically employ screws or other mechanical means to adjust the ejection rams against the store body during weapons loading operations on the ground. One such means is a threaded contact foot which can be extended to be in contact with the store after the store has been loaded into the ejector rack. While the threaded contact foot works well to place the ejection ram into contact with the store and thus to minimize mechanical shock to the store upon ejection, use of the threaded contact foot imposes several limitations. First, so that the extended contact foot does not interfere with loading of a new store, each contact foot must be manually retracted prior to loading new stores onto the ejector rack. Second, each contact foot must be manually adjusted to contact the store during store loading, since stores of varying sizes must be accommodated. These manual operations increase cost and ground turnaround time.

A second means to eliminate gaps between the ram pistons and the store in conventional S&RE ejector racks, and thus to minimize mechanical shock to stores upon ejection, includes a pre-load spring within the piston to automatically bias the ejection ram into contact with the store after loading. If sufficient spring play is provided, a range of store sizes can be accommodated and no manual efforts will be required during reloading. With this approach, however, the ram pistons will be extended some distance outward from the aircraft body after stores ejection, increasing aerodynamic drag on the aircraft accordingly.

Conventional stores ejection mechanisms, therefore, suffer from the limitations discussed above. In particular, some conventional stores ejection mechanisms require manual action to adjust ejection rams into contact with stores after stores loading. Other conventional mechanisms protrude from the aircraft after stores ejection, increasing aircraft aerodynamic drag.

SUMMARY OF THE INVENTION

It is an object of the present invention to provide a stores ejection system that is automatically pre-loaded against the store prior to store ejection so that mechanical shock to the store and the ejection system upon ejection are minimized.

It is a further object of the present invention to provide a stores ejection system that automatically retracts following store ejection so that ejector mechanism aerodynamic drag is minimized.

These and other objects are provided, according to the present invention, by a stores ejection system comprising a source of pressurized fluid, an ejection mechanism adapted to forcibly eject the store upon release of some of the pressurized fluid, and pre-load means for biasing the ejection mechanism toward the store prior to ejection so that the ejection mechanism contacts the store. Preferably, the pre-load means provides more bias force to the ejection mechanism prior to ejection of the store than following ejection of the store. The invention is particularly adapted to non-pyrotechnic ejection systems, such as the pneumatic ejection system disclosed in U.S. Pat. No. 5,583,312.

In another aspect of the present invention, the stores ejection system further comprises means for retracting the ejection mechanism following ejection and during flight to thereby reduce aerodynamic drag otherwise created by the ejection mechanism.

In another aspect of the present invention, a method for forcibly ejecting a store from an aircraft is provided comprising the steps of pre-loading an ejection mechanism into contact with the store, receiving an actuation signal indicating that the store is to be ejected, forcibly extending the ejection mechanism in response to the actuation signal to eject the store, and retracting the ejection mechanism following ejection to thereby reduce aerodynamic drag otherwise created by the extended ejection mechanism.

In one embodiment of the present invention, a pneumatically operated stores ejection system is provided that includes a pressurized air accumulator and an ejection ram to forcibly eject the store upon the release of pressurized air from the accumulator. After the store is loaded into the ejector rack, some portion of the pressurized air in the accumulator is fed to a pre-load piston housing located within the main ejection ram piston housing. The air flow to the pre-load piston housing is isolated from the ejection ram so that the ejection ram remains unpressurized. A small diameter pre-load piston located within the pre-load piston housing is configured to bias the ejection ram piston into contact with the store when the pre-load piston housing is pressurized. The pre-load piston has a small diameter so that it does not overload the ejection rams or the ejector rack store retention hooks.

To eject the store, the remaining pressurized air in the accumulator is quickly released and the store retention hooks are opened. The pressurized air enters the main ejection ram piston housing, forcing the ejection ram piston outward and forcibly ejecting the store. After store ejection, the stores ejection system vents remaining air pressure overboard and the pressure exerted onto the ejection ram piston and the pre-load piston decrease to ambient. The ejection ram is spring loaded to retract after stores ejection, thus minimizing the aerodynamic drag on the aircraft.

The stores ejection system of the present invention, and the associated method for forcibly ejecting a store from an aircraft, overcome limitations imposed by conventional stores ejection systems. In particular, a stores ejection system is provided that is automatically pre-loaded into contact with the store prior to store ejection so that mechanical shock to both the store and the ejection system upon ejection are minimized. Moreover, the stores ejection system automatically retracts following store ejection to minimize aircraft aerodynamic drag following ejection.

BRIEF DESCRIPTION OF THE DRAWINGS

FIG. 1 is a perspective view of an aircraft with an ejector rack and a store mounted underneath an aircraft wing.

FIG. 2 is a schematic block diagram representation of a pneumatic store ejection system according to one embodiment of the present invention.

DETAILED DESCRIPTION OF THE PREFERRED EMBODIMENTS

Figure 3:
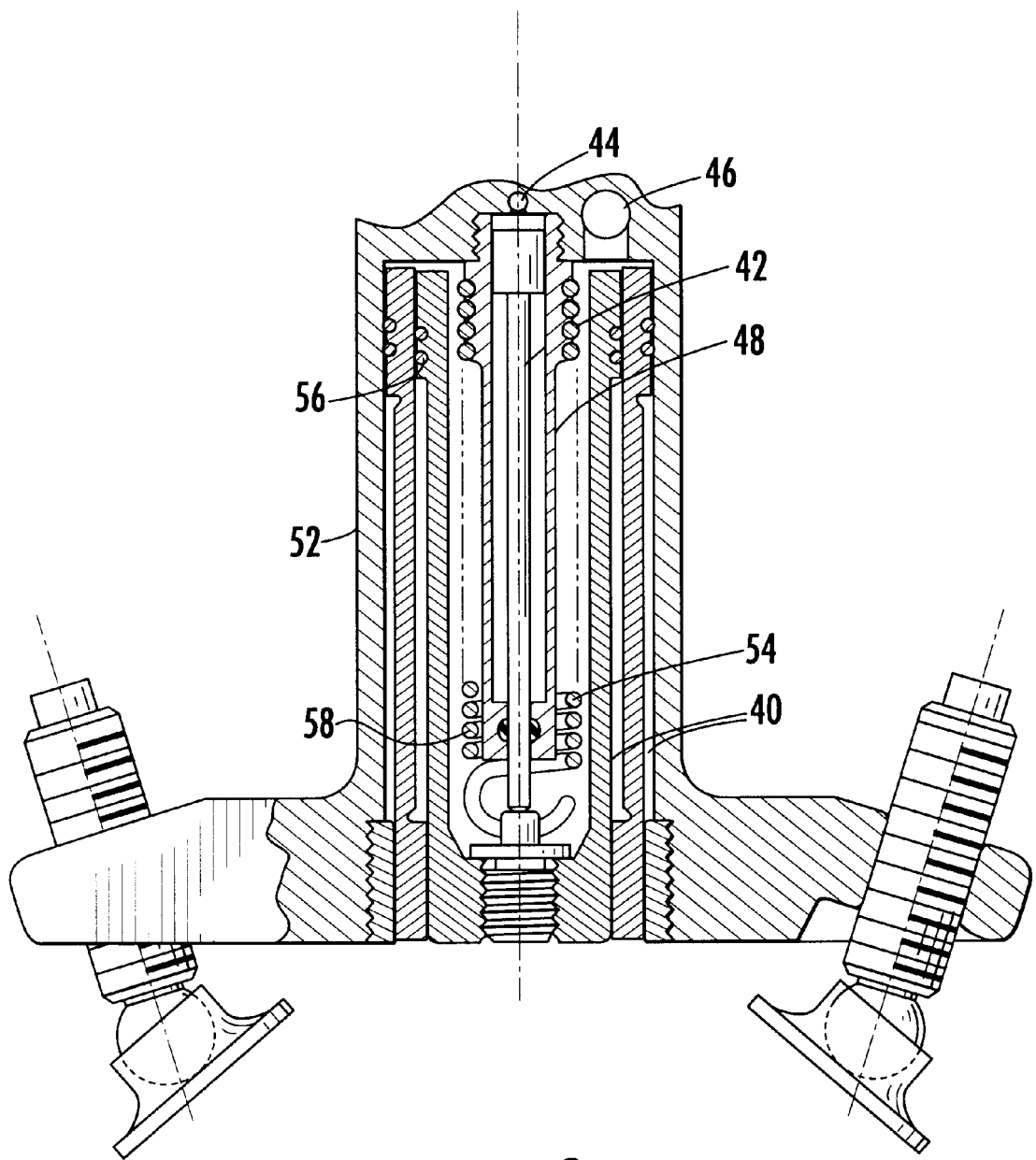
FIG. 3 is a partial cross section depicting an ejection ram and a pre-load piston in a retracted position during flight after store ejection.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIG. 1, an aircraft 10 is shown with ejection system 20 mounted under a wing of aircraft 10. While aircraft 10 is on the ground, store 30 is loaded into ejection system 20 by ground personnel. Store 30 is retained by release hooks 41 of ejection system 20 during flight and is released by release hooks 41 and forcibly ejected by ejection system 20 upon command. When aircraft 10 returns to the ground, a new store 30 may be loaded into ejection system 20.

Ejection system 20 comprises a source of pressurized fluid and fluid control means and is preferably pneumatically operated with air as the pressurized fluid, although other fluids can be utilized. Referring now to FIG. 2, in one embodiment of the invention, filter 32 filters outside air. Compressor 34 pressurizes filtered air from filter 32, and the pressurized air is stored in accumulator 38. Means for controlling release of the fluid from accumulator 38, such as S&RE logic 31, is provided. S&RE logic 31 preferably operates in response to an actuation signal, indicating that the store is to be released, that may be supplied by the pilot or co-pilot of aircraft 10. S&RE logic 31 preferably comprises one or more controllers or related memory elements operating under software control. Pressurized fluid is provided from accumulator 38 through ejection valve 37 to structural housing 52 and pre-load piston housing 48 via manifold conduit 33. Vent valve 36 is provided to vent the pressurized fluid from accumulator 38 to the ambient environment following store ejection.

Figure 4:
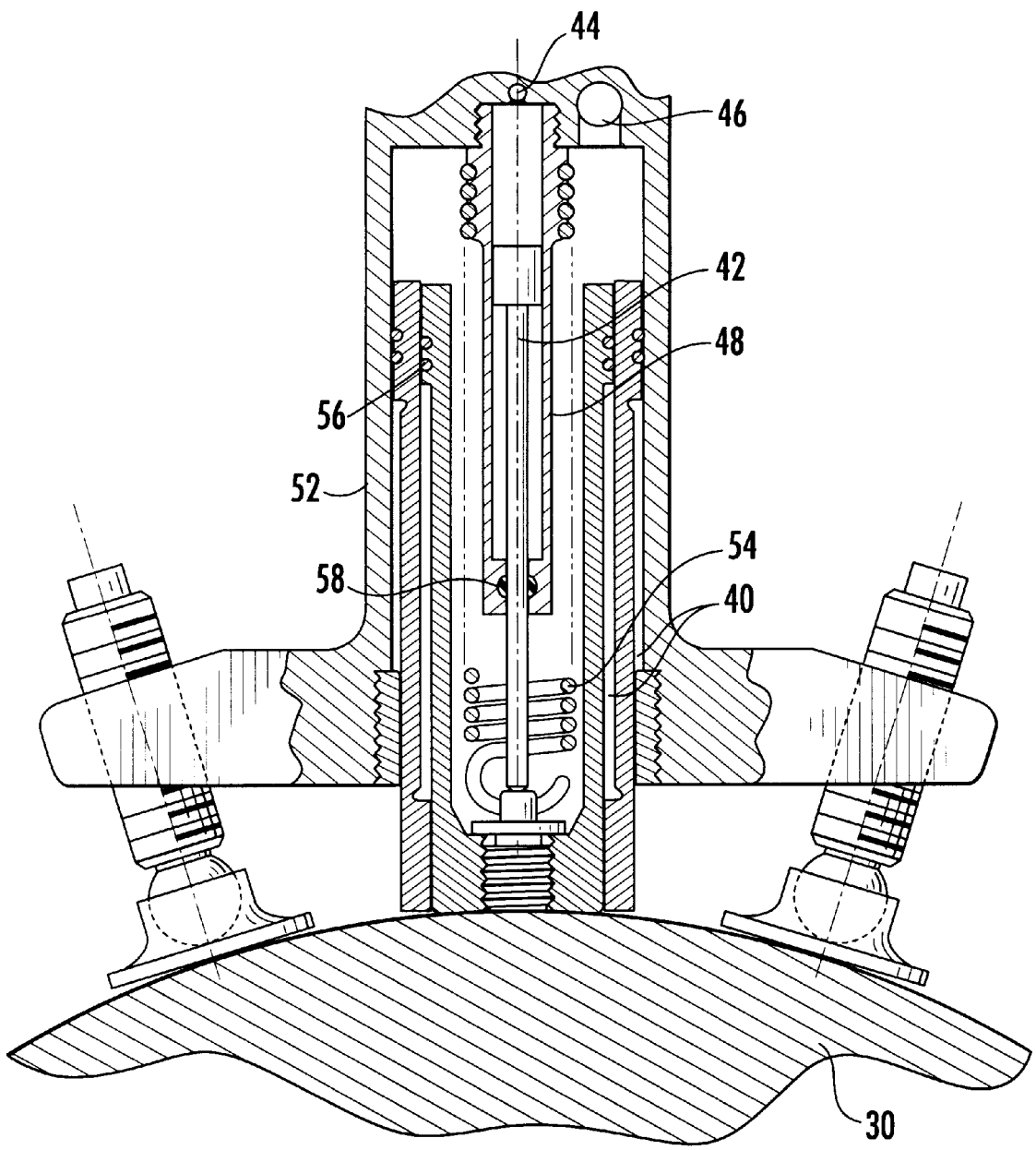
FIG. 4 is a partial cross section depicting an ejection ram and a pre-load piston in a partially extended pre-loaded position after store loading but before store ejection.

Referring now to FIG. 3, ejection system 20 comprises an ejection mechanism, such as ejection ram 40 located within structural housing 52, adapted to be forcibly extended toward store 30 upon release of pressurized fluid from accumulator 38. Before store 30 has been loaded into ejection system 20, ejection system 20 is biased by return spring 54 into the retracted position shown in FIG. 3. The ejection system also includes pre-load means for biasing ejection ram 40 against the store after store loading. Preferably, the pre-load means comprises pre-load piston 42 in fluid communication with accumulator 38. To bias ejection ram 40 against the store 30, pressurized fluid is released from accumulator 38 and ejection valve 37 through pre-load feed port 44 to pre-load piston 42, which is located in pre-load piston housing 48 within ejection ram 40. The pressurized fluid forces pre-load piston 42 against ejection ram 40, which is extended thereby into contact with store 30 as shown in FIG. 4. The mass and diameter of pre-load piston 42 are preferably selected so that the force applied by pre-load piston 42 against ejection ram 40 is enough to overcome the bias force in extended return spring 54 but not enough to overcome ejector rack store retention hooks 41.

Pre-load piston 42 is preferably coaxially disposed within ejection ram 40 and is preferably sealed from structural housing 52 by "O" ring seal 58. Ejection ram 40, on the other hand, is sealed from the ambient environment by relatively imperfect steel split rings 56. Preferably, "O" ring seal 58 and steel split rings 56 are chosen so that slow leakage around steel split rings 56 will prevent inadvertent pressurization of ejection ram 40 in the event that some pressurized fluid leaks around "O" ring seal 58 into structural housing 52.

Figure 5:
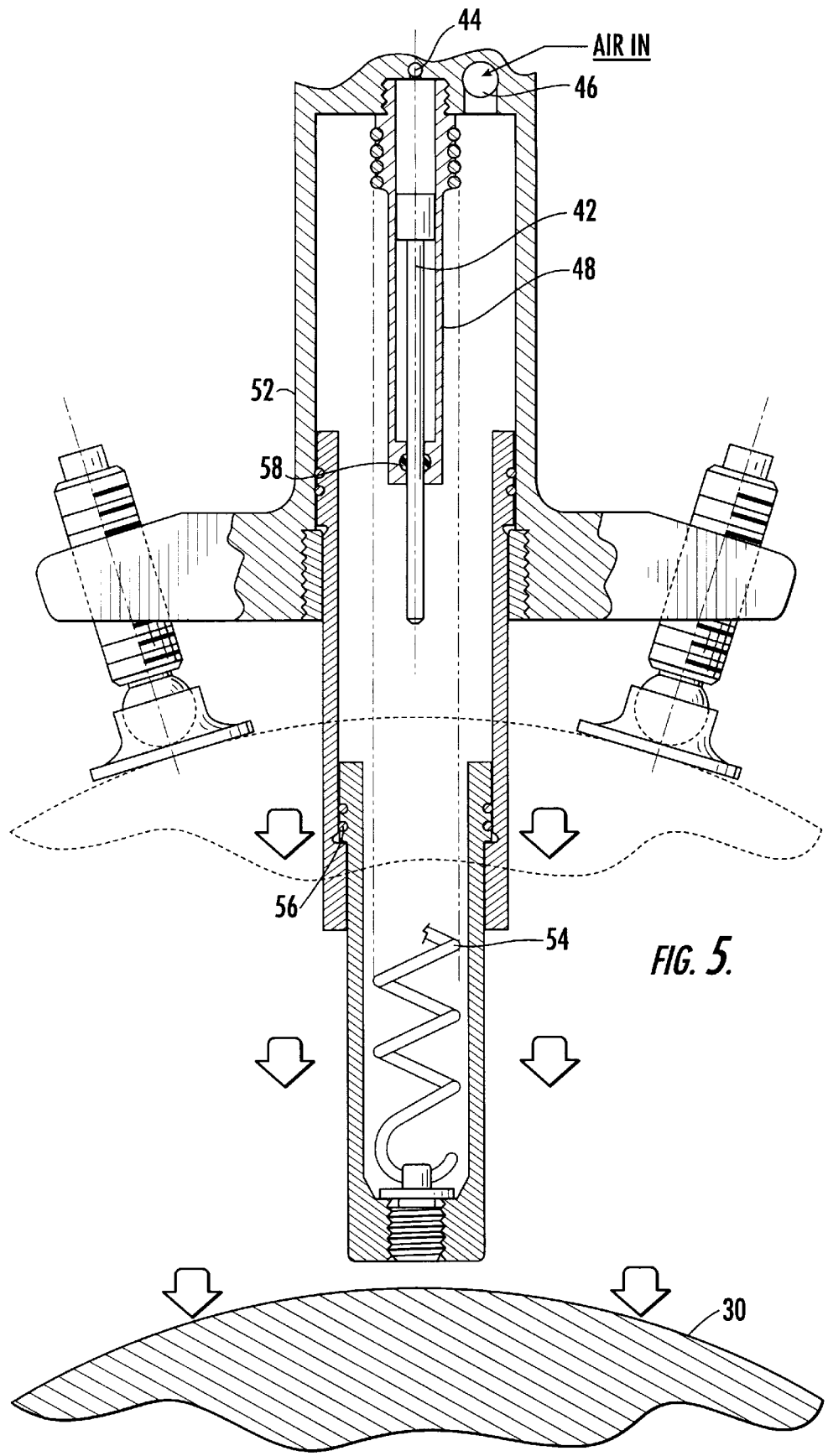
FIG. 5 is a partial cross section depicting a fully extended ejection ram during store ejection.

When S&RE logic 31 receives an actuation signal indicating that store 30 is to be ejected, accumulator 38, in the preferred embodiment, rapidly releases the remaining pressurized fluid through ejection valve 37 and ejection feed port 46 into structural housing 52. The force on ejection ram 40 from the pressurized fluid in structural housing 52 is greater than the force on ejection ram 40 applied by pre-load piston 42 because the diameter of ejection ram 40 is greater than the diameter of pre-load piston 42. Preferably, ejection ram 40 can be extended telescopically toward store 30. Once release hooks 41 are opened and the force on ejection ram 40 exceeds the retracting force of return spring 54, ejection ram 40 is forcibly extended as shown in FIG. 5. Store 30 is thereby forcibly ejected away from aircraft 10. After ejection, the pressurized fluid in structural housing 52 is vented to the ambient environment through vent valve 36, under command from S&RE logic 31. As the fluid vents, retraction means, such as return spring 54, retracts ejection ram 40 with a predetermined spring force once the predetermined spring force exceeds the pressurized fluid force on ejection ram 40. Aerodynamic drag and radar cross section of ejection system 20 are thereby minimized.

Figure 6:
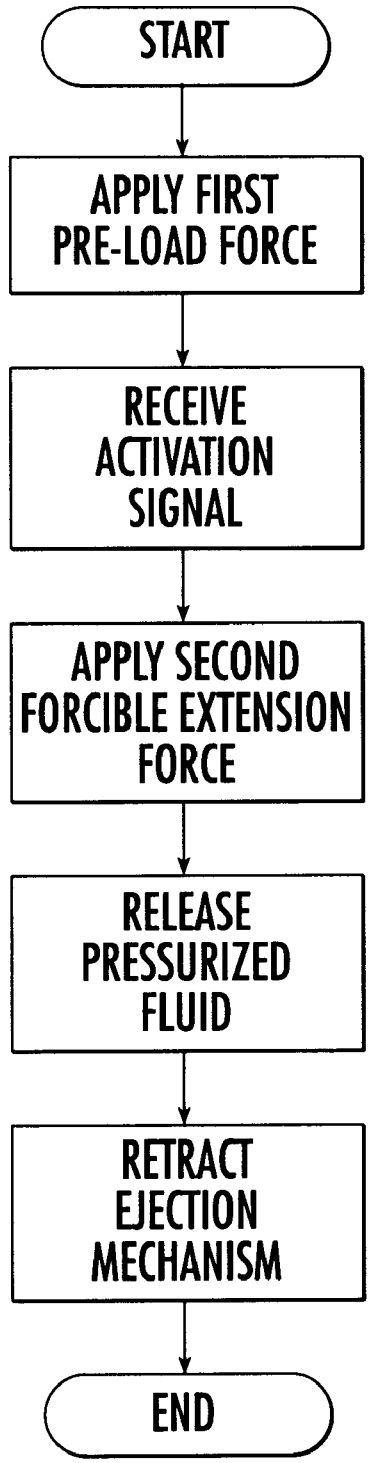
FIG. 6 is a flow diagram illustrating the operations performed by the stores ejection system and method of the present invention.

The method for forcibly ejecting a store of the present invention comprises the steps illustrated in the flow diagram of FIG. 6. The method comprises the step of pre-loading an ejection mechanism, such as ejection ram 40, into contact with store 30, such as by applying a first force to ejection ram 40 to extend ejection ram 40 into contact with store 30. In contrast to a conventional spring-loaded ejection ram, the applied first force is preferably greater prior to ejection of store 30 than after ejection of store 30. The method further comprises the steps of receiving an actuation signal and forcibly extending ejection ram 40, such as by applying a second force, sufficient to forcibly eject store 30, to ejection ram 40 in response to the actuation signal. The applied second force is greater than the applied first force and, in the preferred embodiment, is applied via pressurized fluid.

The method further comprises the step of retracting ejection ram 40 after ejection of store 30 to thereby reduce aerodynamic drag and radar cross section otherwise created by extended ejection ram 40. Preferably, the method also comprises the step of releasing the pressurized fluid, such as through vent valve 36, following the forcible extension of ejection ram 40.

The stores ejection system 20 of the present invention, and the associated method for forcibly ejecting a store from an aircraft, therefore overcome limitations imposed by conventional stores ejection systems. In summary, the stores ejection system 20 of the present invention is automatically pre-loaded into contact with the store 30 prior to ejection so that mechanical shock to both the store 30 and the ejection system 20 during ejection are minimized. Moreover, the stores ejection system 20 automatically retracts following store ejection so that ejection system aerodynamic drag and radar cross section following store ejection are minimized.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A stores ejection system for forcibly ejecting a store from an aircraft, the stores ejection system comprising:

a source of pressurized fluid;

an ejection mechanism adapted to be forcibly extended toward the store upon release of at least some of the pressurized fluid such that said ejection mechanism ejects the store; and pre-load means for biasing said ejection mechanism toward the store prior to ejection of the store such that said ejection mechanism operably contacts the store prior to the forcible extension of said ejection mechanism, said pre-load means being adapted to provide greater amounts of bias force to said ejection mechanism prior to ejection of the store than following ejection of the store, wherein said pre-load means comprises a pre-load piston operably connected to said ejection mechanism, said pre-load piston being responsive to said source of pressurized fluid such that both said pre-load piston and said ejection mechanism are extended toward the store prior to ejection of the store.

2. A stores ejection system according to claim 1 wherein said ejection mechanism comprises an ejection ram which defines an internal cavity, and wherein said pre-load piston is at least partially disposed within the internal cavity defined by said ejection ram.

3. A stores ejection system according to claim 2 wherein said ejection ram and said pre-load piston are disposed in a coaxial configuration.

4. A stores ejection system according to claim 1 further comprising fluid control means for controlling release of fluid from said source of pressurized fluid, said fluid control means being adapted to provide said pre-load piston with fluid sufficient to apply no more than a first fluid pressure, said fluid control means also being adapted to provide said ejection mechanism with fluid sufficient to apply at least a second fluid pressure, wherein the second fluid pressure is greater than the first fluid pressure and sufficient to forcibly eject the store from the aircraft.

5. A stores ejection system according to claim 1 further comprising retraction means for retracting said ejection mechanism following ejection of the store and during flight of the aircraft to thereby reduce aerodynamic drag otherwise created by said extended ejection mechanism.

6. A stores ejection system according to claim 5 wherein said retraction means comprises a spring which retracts said ejection mechanism with a predetermined spring force once the predetermined spring force exceeds the force applied by said pre-load means.

7. A stores ejection system according to claim 1 wherein said source of pressurized fluid comprises a vent for releasing the pressurized fluid following ejection of the store.

8. A stores ejection system for forcibly ejecting a store from an aircraft, the stores ejection system comprising:

a source of pressurized fluid;

a housing;

a pre-loadable ejection mechanism at least partially disposed within the housing and adapted to be pre-loaded into operable contact with the store prior to ejection of the store and also adapted to be further forcibly extended upon release of at least some of the pressurized fluid such that said ejection mechanism ejects the store; and retraction means for retracting said pre-loadable ejection mechanism following ejection of the store and during flight of the aircraft, said retraction means retracting said pre-loadable ejection mechanism completely into said housing to thereby reduce aerodynamic drag otherwise created by said extended ejection mechanism.

9. A stores ejection system according to claim 8 wherein said retraction means comprises a spring which retracts said ejection mechanism with a predetermined spring force once the predetermined spring force exceeds the force applied by the pressurized fluid.

10. A stores ejection system according to claim 8 further comprising pre-load means for biasing said ejection mechanism toward the store prior to ejection of the store such that said ejection mechanism operably contacts the store prior to the forcible extension of said ejection mechanism.

11. A stores ejection system according to claim 8 wherein said source of pressurized fluid comprises a vent for releasing the pressurized fluid following ejection of the store.

12. A stores ejection system for forcibly ejecting a store from an aircraft, the stores ejection system comprising:

a source of pressurized fluid;

a pre-loadable ejection mechanism adapted to be pre-loaded into operable contact with the store prior to ejection of the store and also adapted to be further forcibly extended upon release of at least some of the pressurized fluid such that said ejection mechanism ejects the store;

retraction means for retracting said pre-loadable ejection mechanism following ejection of the store and during flight of the aircraft to thereby reduce aerodynamic drag otherwise created by said extended ejection mechanism; and pre-load means for biasing said ejection mechanism toward the store prior to ejection of the store such that said ejection mechanism operably contacts the store prior to the forcible extension of said ejection mechanism, wherein said pre-load means comprises a pre-load piston operably connected to said ejection mechanism, said pre-load piston being responsive to said source of pressurized fluid such that both said pre-load piston and said ejection mechanism are extended toward the store prior to ejection of the store.

13. A stores ejection system according to claim 12 wherein said ejection mechanism comprises an ejection ram which defines an internal cavity, and wherein said pre-load piston is at least partially disposed within the internal cavity defined by said ejection ram.

14. A stores ejection system according to claim 13 wherein said ejection ram and said pre-load piston are disposed in a coaxial configuration.

15. A stores ejection system according to claim 12 further comprising fluid control means for controlling release of fluid from said source of pressurized fluid, said fluid control means being adapted to provide said pre-load piston with fluid sufficient to apply no more than a first fluid pressure, said fluid control means also being adapted to provide said ejection mechanism with fluid sufficient to apply at least a second fluid pressure, wherein the second fluid pressure is greater than the first fluid pressure and is sufficient to forcibly eject the store from the aircraft.

16. A method for forcibly ejecting a store from an aircraft, the method comprising the steps of:

pre-loading an ejection mechanism into operable contact with the store;

receiving an actuation signal indicating that the store is to be ejected;

forcibly extending the ejection mechanism further from a housing in response to the actuation signal such that said ejection mechanism ejects the store; and retracting said ejection mechanism completely into the housing following ejection of the store and during flight of the aircraft to thereby reduce aerodynamic drag otherwise created by the extended ejection mechanism.

17. A method according to claim 16 wherein said pre-loading step comprises applying a first force to said ejection mechanism to thereby extend said ejection mechanism into operable contact with the store, wherein said forcibly extending step comprises applying a second force to said ejection mechanism to thereby further extend said ejection mechanism, and wherein the second force is greater than the first force and is sufficient to forcibly eject the store from the aircraft.

18. A method according to claim 16 wherein said forcibly extending step comprises applying pressurized fluid to the ejection mechanism to thereby further extend the ejection mechanism, and wherein the method comprises the step of releasing the pressurized fluid following said forcibly extending step.

19. A method according to claim 16 wherein said pre-loading step comprises providing greater amounts of bias force to the ejection mechanism prior to ejection of the store than following ejection of the store.

* * * * *